United States Patent [19]
Martin et al.

[11] 3,746,827
[45] July 17, 1973

[54] PROFILED ELECTRODE FOR ELECTRO-EROSIVE BORING

[75] Inventors: Wilhelm Martin, Werner Rieger, both of Grebben, Germany

[73] Assignee: Glanzstoff AG, Wuppertal, Germany

[22] Filed: Oct. 15, 1970

[21] Appl. No.: 80,974

[30] Foreign Application Priority Data
Oct. 18, 1969 Germany............P 19 52 587.2

[52] U.S. Cl. ............ 219/69 E, 72/224, 204/143 M
[51] Int. Cl. ....... B21b 13/12, B23p 1/04, B23p 1/08
[58] Field of Search ..................... 219/69 E; 72/224; 204/143 M

[56] References Cited
UNITED STATES PATENTS
3,087,043    4/1963    Hofer ............................... 219/69 E
3,125,665    3/1964    Snider .............................. 219/69 E
3,200,231    8/1965    Bejat ............................... 219/69 E Primary Examiner—R. F. Staubly
Attorney—Johnston, Root, O'Keeffe, Keil, Thompson & Shurtleff

[57] ABSTRACT

A finely profiled copper electrode for electro-erosive boring having a multi-lobal cross-section of a plurality of radially extending arms having a thickness of less than about 80 microns and terminating within an outer circumference of less than about 600 microns, the electrode being formed by cold rolling a calibrated hard drawn copper wire with the ends of the arms being cut to size and shape. Such electrodes are especially useful in boring the openings in a nozzle plate for spinning profiled filaments of a fibrous polymer.

9 Claims, 10 Drawing Figures

Patented July 17, 1973 3,746,827

INVENTORS:
WILHELM MARTIN
WERNER RIEGER
BY:
Johnston, Root
O'Keefe, Keil,
Thompson & Shurtleff
ATT'YS Patented July 17, 1973 3,746,827

INVENTORS:
WILHELM MARTIN
WERNER RIEGER
BY: Johnston, Root, O'Keeffe, Keil, Thompson+Shurtleff
ATT'YS Patented July 17, 1973

INVENTORS:
WILHELM MARTIN
WERNER RIEGER

BY: Johnston, Root, O'Keeffe, Keil, Thompson & Shurtleff
ATT'YS

PROFILED ELECTRODE FOR ELECTRO-EROSIVE BORING

It has become increasingly desirable to produce profiled filaments of fiber-forming polymers, especially synthetic linear polymers such as nylons and polyesters, by spinning through nozzle bores or orifices having a multi-lobal cross-section which deviates substantially from the basic circular cross-section. The outer circumferential dimensions of such filaments are preferably maintained within a circumferential diameter of 600 microns, while providing at least two and preferably three or more radially projecting arms or shanks which extend axially along the produced filament. The best known filaments of this type have a three-lobed cross-section or triangular configuration, and their properties in many respects are quite superior to filaments having a conventional circular cross-section, for example by providing improved stability or better creasing recovery, high covering power and the like.

In the initial development of such profiled fibers or filaments, spinning nozzles were employed in which individual circular bores or openings were placed closely adjacent to one another in order to form each filament, the polymeric spinning fluid from each bore flowing together at the outlet surface of the nozzle plate to achieve a multi-lobal cross-sectional shape. This approach is generally quite unsatisfactory since it is extremely difficult to obtain uniform filaments and the projecting lobes are limited to a more or less semi-circular shape which differs only slightly from conventional circular filaments.

From the very beginning, it was primarily desired to obtain filaments with radially projecting arms having very distinct shapes and a relatively narrow thickness or width compared to their radial extension when viewed in cross-section. However, this places a very high demand on the quality of the spinning bores or openings with reference to their exact shape, trueness to size and smoothness of the wall surfaces. The production of these spinning bores in the nozzle plate proved to be extremely expensive. For example, in one procedure these bores were produced by first drilling a small hole corresponding to the center of the profiled shape and, proceeding from this, punching out the desired shape with a very fine impact tool. This is a very time-consuming procedure and subject to slight variations which can be costly if an entire nozzle plate must be rejected due to an error committed in one of the many openings required in a single plate.

An attempt has been made to prepare these profiled spinning bores by the well known electro-erosive process, sometimes referred to as electric discharge machining or electrodischarge boring. (See, for example, such references as "New Developments in Spark-Erosion Machining" by H. Opitz, Microtecnic, Vol. 13, page 147, 1959, and "The Electro-Erosion of Machining of Metals" by A. L. Livshits, translated by E. Bishop, Butterworth & Co., Ltd., London, 1960.) In this instance, a thin cylindrical wire in the form of an electrode is first preset at the beginning of the desired profile, for example at the center or one end of the location of a radially projecting arm required for a multi-lobal cross-section, and a circular opening or bore is made into the nozzle point by axial penetration of the wire electrode during its electric discharge. The wire electrode is then moved laterally to develop the desired shape of each arm, i.e. by electroerosion in the direction of movement of the electrode. This process has also been found to be very time-consuming and to involve many uncertainty factors with respect to the accuracy of the profiled bores as they are being formed. Furthermore, this technique cannot be used to yield a profiled shape having sharp corners.

One object of the present invention is to provide a finely profiled copper electrode which permits the production of the required profiled spinning bores by electro-erosive means in a single step, i.e. by using an electrode which has the same profile as the spinning bore so that the electrode can be axially directed into the nozzle plate to completely form the bore with great accuracy and with a smooth, faultless surface. Another object of the invention is to provide a method of forming the profiled copper electrode so that it will have a very uniform and homogeneous structure, not only with respect to its precise dimensions but also with respect to the internal structure and properties of the metal. These and other objects and advantages of the invention are explained in greater detail in the following specification.

It has now been found, in accordance with the invention, that it is possible to achieve the desired means for electroerosive boring of profiled spinning bores or the like by providing an elongated copper element having a profiled multi-lobal cross-section defined by a plurality of radially projecting arms which are confined within an outermost circumference of less than about 600 microns diameter and which have a thickness or width, as viewed in cross-section, of between approximately 15 and 80 microns, preferably less than 60 microns and ideally less than 40 microns. This finely profiled electrode must be formed by cold rolling a hard drawn cylindrical copper wire in order to achieve a uniform and homogeneous electrode with reference to its internal structure and properties which are required to achieve the desired uniform electrical discharge or erosive boring effect.

It is also important in the process for the production of the electrode, especially in making very fine profiles of less than 60 microns and preferably less than 40 microns thickness of the arms, to cold roll a number of times between a plurality of rollers which have been preset to the desired final cross-sectional thickness dimensions of the arms while intermediately heating or annealing the profiled copper wire at least once and preferably several times for stress relief between consecutive rolling steps. The process of the invention also includes at least one step of cutting or paring the outer projecting ends of the arms to predetermined dimensions. A tri-lobal electrode is especially preferred in which the three radially projecting arms can assume a wide variety of shapes or configurations, but with a substantial portion thereof having the required small thickness or width in comparison to their radial extension as the dimension of length, as viewed in cross-section. In the axial direction, the arms maintain a highly uniform position and structural arrangement along the length of the electrode.

The invention is more fully explained with reference to the accompanying drawings in which.

Figure 5:
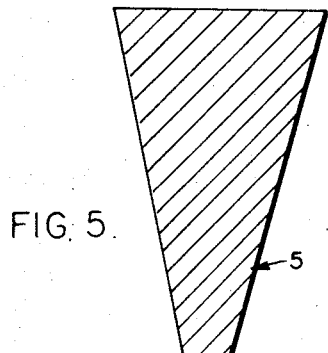
Figure 6:
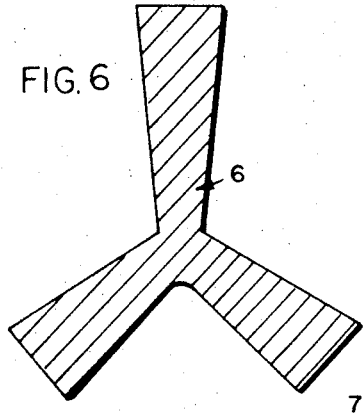
Figure 7:
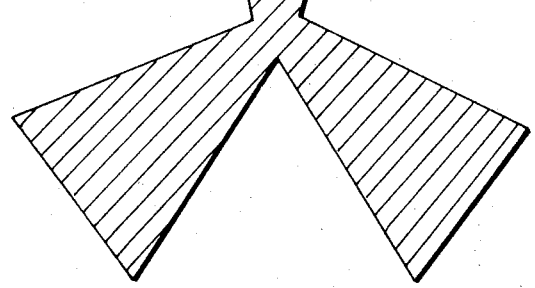

The various electrodes 1 through 7 shown in FIGS. 1-7 indicate clearly the variety of cross-sectional shapes which can be achieved, i.e. to the extent that the profiles can be reasonably achieved by cold rolling while cutting only the terminal end portions of the radially projecting lobes or arms. FIG. 7 illustrates one very specific embodiment in which the two electrodes 7 are identical with two relatively elongated wedge-shaped arms 7a and 7b together with a much shorter semi-circular lobe 7c projecting radially outwardly from the central axis of each electrode. These two electrodes can then be located adjacent each other in mirror symmetry as shown in FIG. 7 and held in place by a conventional electrode holding device with the two short lobes 7c facing each other. The dimensions and placement of the two electrodes are made with due regard for the fact that the bore or opening being produced in a spinning nozzle plate is somewhat larger than the electrode itself due to the amount of material being burned off during the so-called electrodischarge. Thus it is possible to produce a spinning bore having a generally H-shaped configuration by placing the two lobes 7c quite close to each other. These and similar variations will be readily apparent to those familiar with the electro-erosion process.

In all of the remaining embodiments of individual electrodes 1-6, there is imparted a tri-lobal cross-section by cold rolling with correspondingly profiled rollers, the radially projecting arms in each instance preferably being positioned at an angle of 120° from each other and with approximately the same shape. However, it is also possible to vary the shape and size of each individual arm either during the cold rolling so as to achieve arms having different thicknesses and/or during the cutting step to vary the final radial length of the arms.

Figure 4:
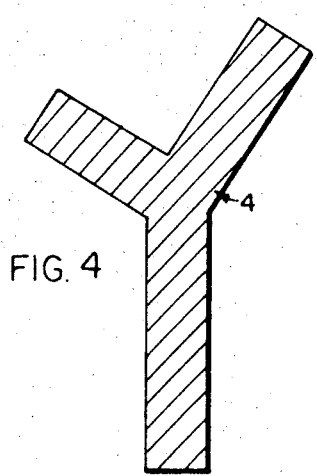

In the illustrated electrodes 1-6, the smallest width or thickness of the radially projecting arms, i.e. as viewed in the cross-section varies between about 22 microns (FIG. 5) and 78 microns (FIG. 4). Thus, where the sides of each arm are not parallel to each other, the critical width or thickness is often the narrowest over the projecting length of the arm. This is particularly true where the narrowest portion occurs centrally of the electrode as in FIGS. 1, 2, 4, 5 and 6. It is a particular advantage of the invention that electrodes can be produced in which the cross-sectional thickness of the arms can be reduced down to extremely small dimensions as low as approximately 15 microns. Very finely profiled spinning bores can then be made with these electrodes as is often desired in producing textile filaments having especially useful properties.

Figure 8:
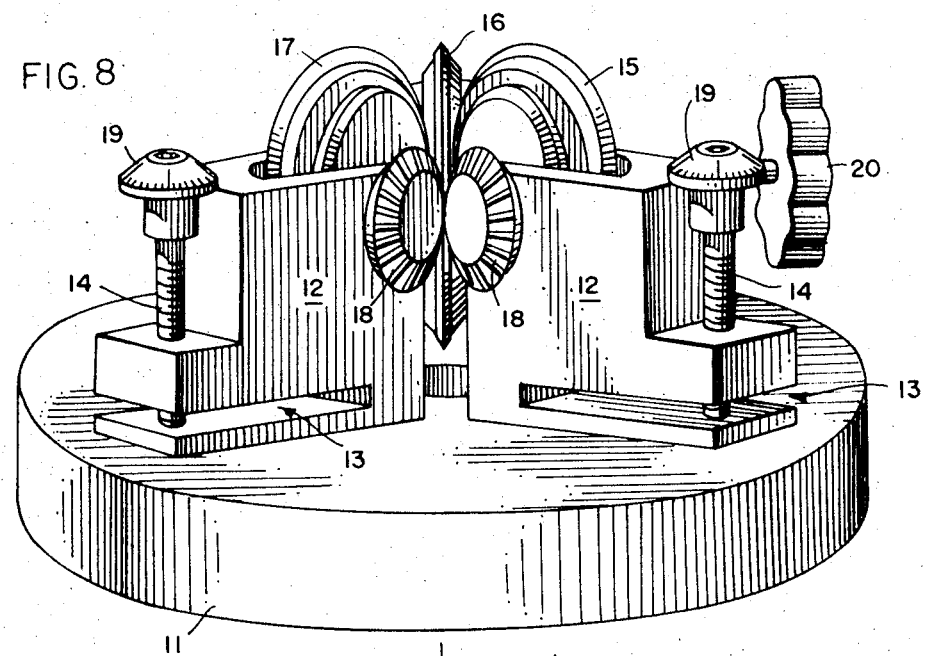
FIGS. 8 and 9 are perspective and top plan views, respectively, of rolling apparatus which is particularly adapted to produce tri-lobal electrodes by means of profiled rollers.
Figure 9:
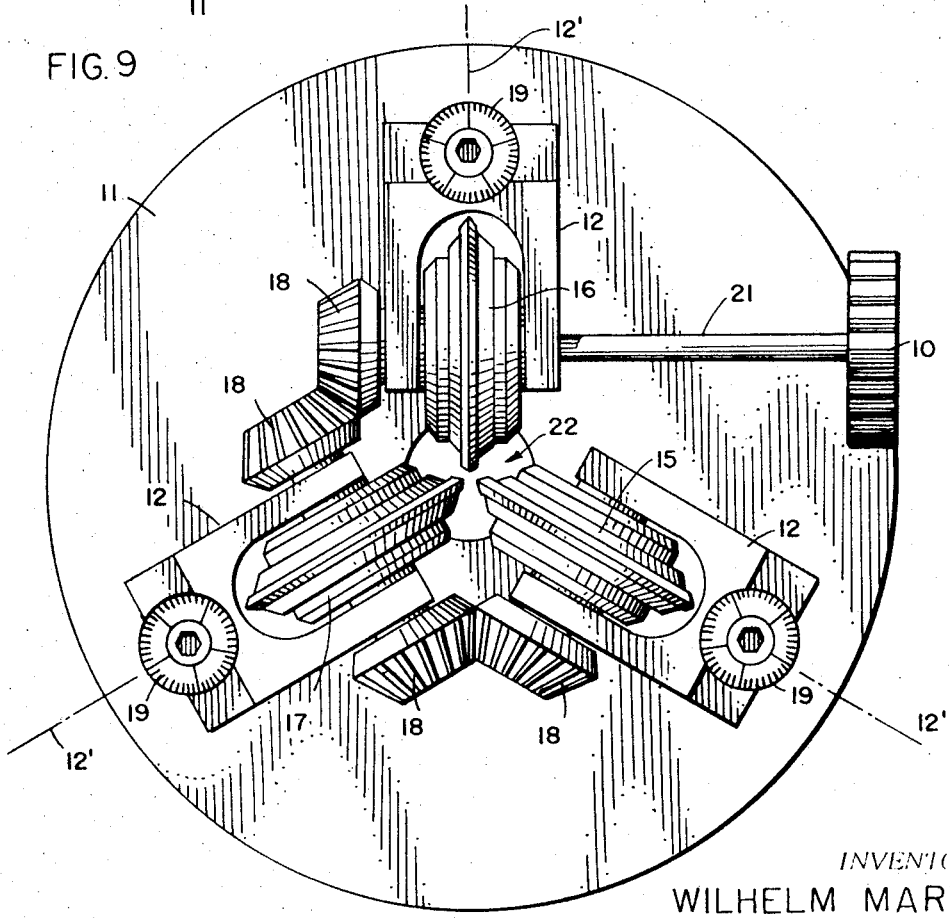
Figure 10:
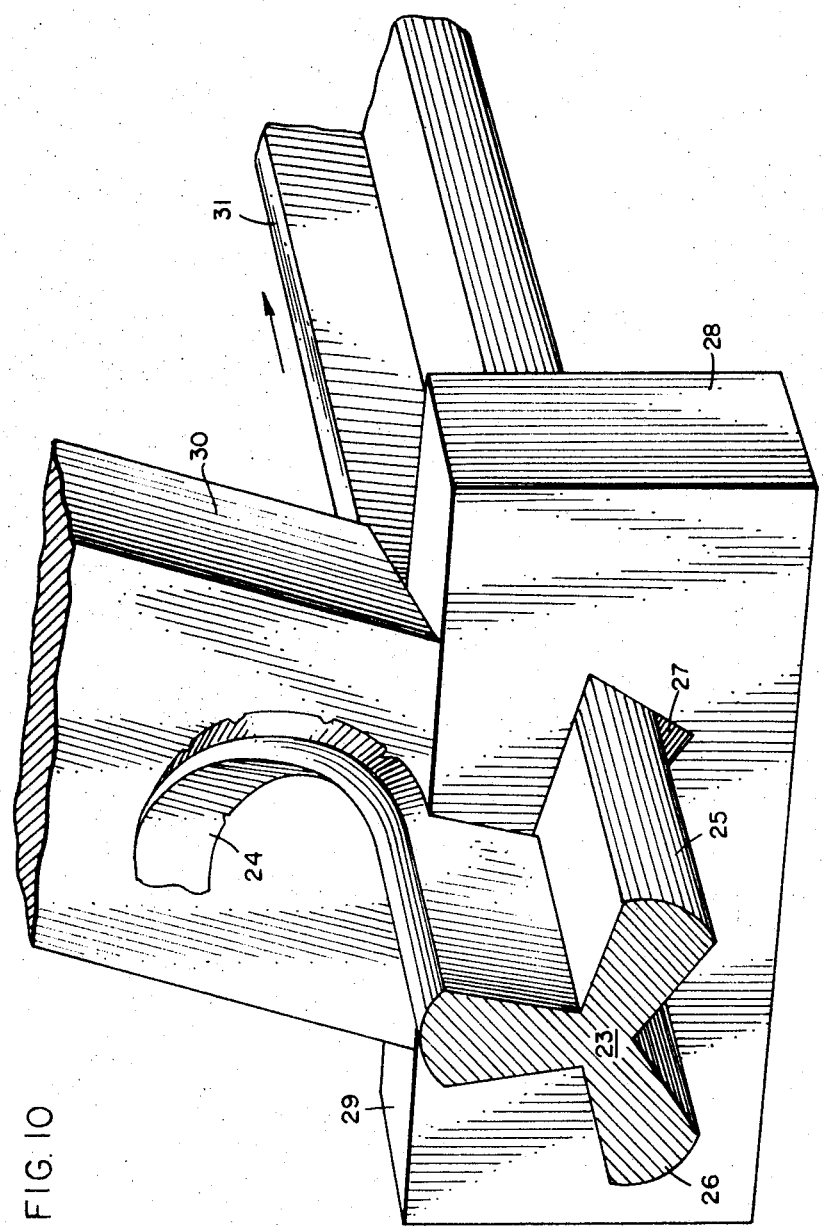
FIG. 10 is a perspective view and partly schematic illustration of a paring or cutting device adapted to trim or shape the electrode to its final cross-sectional configuration.

FIGS. 8-10 illustrate the types of apparatus which are most useful in the shaping and sizing of the individual electrodes and can be explained with reference to the preparation of those electrodes having the preferred tri-lobal cross-section. This apparatus and the process are further explained in terms of producing the electrode of FIG. 1.

The cold rolling apparatus shown in FIGS. 8 and 9 includes a base plate 11 to which there is secured three similar bearing or supporting blocks 12 with their center lines 12' disposed at an angle to one another which is determined by the desired electrode profile, i.e. the angular displacement of the electrode arms. The blocks 12 can be adjustably or removably mounted on the base plate in any suitable manner so that one can achieve any specific angular displacement between these blocks with a relatively high degree of accuracy, for example by keying the blocks to the plate or the like. In many instances, however, it is preferred to have an equal angular displacement between the blocks so that they can be mounted more permanently in this fixed position. Each block 12 is provided with a rectangular or oblong slot 13 adjacent its lower end and extending from its outer face toward the center of the apparatus. This slot 13 together with a setting screw 14 permits a very fine adjustment of each individual profiled roller 15, 16 and 17 rotatably carried by their respective blocks and interconnectedly driven by the bevel gears 18 which have equal numbers of teeth. The fine adjustment of the profiled rollers is thus conveniently achieved with the aid of the calibrated dial 19 which turns the set screw 14 bridging slot 13 so as to change the position of the associated roller by very slight and gradual increments.

Each of the profiled rollers 14, 16 and 17 are carried together with the bevel gears 18 on rotatable shafts journaled in the bearing blocks 12 and accurately positioned in about the same plane so that all rollers can be driven at the same time through the gear linkages while the rollers bear centrally on the electrode material being profiled. In the particular embodiment of FIGS. 8 and 9, the rollers are driven manually by means of a hand-operated wheel 20 connected to an extension of one shaft 21 which in turn is connected to the first profiled roller 16 in the gear linked series of rollers.

The specific rollers 15, 16 and 17 as shown in FIGS. 8 and 9 are profiled in such a manner as to produce an electrode from a calibrated cylindrical copper wire or blank such that the finished electrode has an axially symmetrical profile, i.e. a cross-sectional configuration with three pie-shaped arms or shanks similar to that shown in FIGS. 5 and 6, the center lines of adjacent arms being separated by an angle of 120° corresponding to the arrangement of the blocks 12 and the supported profiled rollers. In this case, the electrode arms are profiled somewhat irregularly while converging in thickness as they approach the longitudinal axis or center of the electrode.

Thus, in cold rolling the initial cylindrical copper wire, it is passed consecutively from about two to ten times, preferably about four to eight times through the roller assembly which has been accurately preset to provide the desired profiled opening 22 formed by the rollers 15, 16 and 17. With the formation of axially symmetrical arms on the electrode, a procedure is preferably followed in which the electrode is turned on its longitudinal axis through an angle of 120° between each consecutive run or pass through the roller assembly. In this manner, one can achieve an extremely uniform shaping of each profiled arm and also a very homogeneous internal or cross-sectional structure with uniform physical and electrical properties of the copper electrode. Intermediate heating or annealing of the electrode between consecutive roller steps is also quite advantageous in this respect.

It will be understood, of course, that it is possible to carry out a single continuous production of the electrodes with repeated steps of cold rolling at the same setting of the profiled opening, for example by employing a plurality of roller assemblies arranged in sequence and operating at substantially the same speed of wire draw, i.e. so that the transported wire is not stretched or bent to any substantial degree. Also, it should be noted that the roller assembly need not be arranged on a horizontal basis with vertical travel of the profiled wire as indicated in FIGS. 8 and 9, but instead one can equally well employ other arrangements. The profiled rollers can be driven by a motor or other suitable means, preferably at a predetermined speed consistent with the size of the electrode being produced. Such variations will be readily apparent as being equivalent to the specific cold rolling apparatus illustrated herein.

The diameter Of the calibrated cylindrical copper wire employed as a blank or piece to be formed is generally selected such that the radially projecting arms acquire a projecting length in the profiled openings of the cooperating rollers which is somewhat greater than that desired in the finished electrode. The ends of the initially formed arms can then be cut or pared quite accurately to achieve an exact dimension with respect to this projecting length. Depending upon the diameter of the initial wire blank, the projecting arms are substantially formed in the first rolling step or usually not more than two passes through suitable rollers, including one preliminary rolling step. This initial deformation which is approximately perpendicular to the direction of rolling, i.e. to the wire axis, is then equalized or made much more accurate by a number of consecutive rolling steps through the same preset dimensions. It will be apparent that these consecutive rolling steps also ensure the accuracy of the width or thickness of the projecting arms, and any slight variations in their length can be corrected in the final paring or cutting step.

In general, the rolling device employed for purposes of the inventiOn is adjusted to provide a specific profile, first by coarsely adjusting the bearing blocks 12 together with the rotatably mounted profiled rollers 15, 16 and 17 and secondly by finely adjusting the position of these rollers by means of the calibrated dials 19. Other similar means of achieving exact dimensions of the profiled opening defined by the rollers can be easily provided by one skilled in this art, preferably employing prefabricated gauges having the exact measurements of the desired profile, or still better means for optical measurement as are known in the art.

A suitable paring or cutting device is illustrated somewhat schematically in FIG. 10 in which the finally rolled electrode 23 being cut to size and shape has a somewhat different cross-sectional profile than that which would be produced by the rollers in FIGS. 8 and 9. In this instance, the edges of the projecting arms are substantially linear and smooth and do not have the irregular shape or bulges as indicated by FIGS. 8 and 9. A pared shaving or cut-away portion 24 of one arm of the electrode 23 is removed as the remaining uncut arms or shanks 25 and 26 are conducted through supporting slots 27 in a guide block 28, these slots having an excess or additional length as compared to the cross-sectional arm length of the electrode. On the upper surface 29 of the block 28, there is resiliently mounted a sharp paring knife or blade 30, for example with a spring mount such that the blade is accurately positioned and held in place during the cutting operation, i.e. as the electrode 23 is drawn against the cutting blade 30 by means of any conventional drawing means (not illustrated). This single cutting finishes one arm of the electrode to achieve the smooth, flat end surface 31 with the illustrated blade and holder arrangement.

Where the electrode has an axially symmetrical profile as shown in FIG. 10, the same block or holder 28 can be used for sequentially paring the ends of each arm of the electrode 23, simply by rotating the electrode by 120° around its axis and again drawing it through the blade and holder assembly. In order to achieve asymmetrical profiles, it is necessary to employ a number of these cutting devices corresponding to the number of arms of different length. Variations can then also be made in the size and/or shape of the block guides or slits 27 so as to accommodate the cutting device to any particular profile at any particular stage of cutting. In order to facilitate the insertion of the electrode with an asymmetrical profile, one can use a magnifying glass for careful observation of the installation.

In carrying out the cutting or paring operation for a particular run of the elongated and cold-rolled electrode wire, the simplest procedure is to provide means for raising the blade 30 from the top surface 29 of block 28, whereby the electrode to be cut can be guided through the block openings and clamped to the wire drawing means before the blade 30 is set in place. When beginning the paring or cutting in this manner, it will be recognized that a short portion of the electrode wire is not cut and cannot be used. However, this is not a serious disadvantage, especially because this uncut end can be employed as a means for holding or clamping the electrode in a guide rod during electroerosive boring, i.e. when cutting relatively short lengths of an individual electrode so that each electrode has this short uncut portion. On longer cutting runs where a plurality of individual electrodes are eventually divided out of the rolled and cut profiled length of wire, all but the last uncut portion have a uniform profile over their entire axial length, and the guide rod for electro-erosive boring can be adapted to the precise profile required. For very precise working electrodes, it is preferable to cut each individual electrode by itself on one or more cutting devices as shown in FIG. 10.

Figures 1, 2, 3:
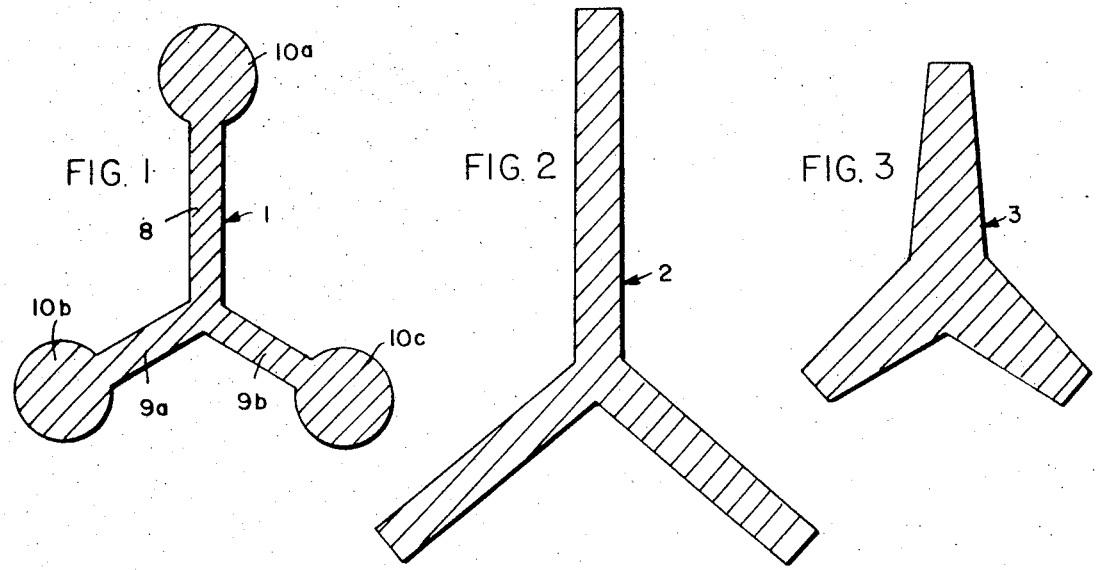
FIGS. 1-7 are cross-sectional views of a number of different preferred embodiments of copper electrodes produced according to the invention.

Referring now to FIG. 1 of the drawings, the electrode 1 has one slightly longer projecting arm 8 and two somewhat shorter arms 9a and 9b with end portions 10a, 10b and 10c of circular cross-section. In order to achieve this relatively unusual shape or configuration, it is possible to cold roll and subsequently cut the ends of the arms as generally described herein with only minor variations in the necessary rolling and cutting tools. By using three rollers as indicated in FIGS. 8 and 9, a profiled opening can be made wherein there are essentially two straight sides formed by adjacent rollers for each arm, these straight sides having a semi-circular indentation intermediate their length so as to correspond to the circular shape of the enlarged end portions 10 of the electrode 1. During cold rolling of the initial wire blank, the material being formed is filled completely into these semi-circular areas of the profiled rollers and slightly outwardly beyond these areas, for example into an open-ended zone having the same width as arms 8, 9a or 9b, or preferably into a somewhat more constricted zone. This leaves a ridge or rib at the outermost radial projection of the circular portions 10 which can be easily pared off with a correspondingly arcuate-shaped blade.

If desired, minor imperfections or very slight deviations from the required dimensions can be corrected by a final buffing or polishing steps, but it is a particular advantage of the invention that such refinements can generally be avoided.

The following example serves to further illustrate the invention and the production of a specific electrode as shown in FIG. 1 to be used for the electro-erosive boring of profiled spinning openings to yield polymer filaments having the same profile. In this connection, it is well known in the electro-erosive boring art that the electrode itself must have slightly smaller dimensions than the bore to be formed due to the nature of the erosion, i.e., the amount of material being removed during electrical discharge or the so-called "burn-off" around the electrode. The smaller dimensions of the electrode in proportion to the desired size of the spinning opening can be easily calculated in accordance with a predetermined amount of burn-off based upon the required operating data of the electro-erosion process, especially because this burn-off is virtually equal at all points around the profile of the electrode. In the following example, the thickness of this burn-off was calculated as being 6 microns and the electrode was thus profiled with this uniform reduction in dimensions.

EXAMPLE

An electrode was desired for the purpose of achieving a spinning opening corresponding exactly to the profile of FIG. 1 with three projecting arms as seen in cross-section wherein:
  a. two arms are of equal length while the third arm is slightly longer;
  b. the sides of each arm run parallel from the center of the electrode outwardly to end in an enlarged portion of circular cross-section, the diameter of which is about three times the width or thickness of the arms;
  c. the lines bisecting each arm cross at a point which is offset by approximately an arm width from the center of a circle passing through the three points located at the center of each circular enlargement 10;
  d. the lines bisecting each arm form equal angles with each other, i.e., so that each of these lines is separated from the other by an angle of 120°;
  e. each arm width or thickness between its parallel sides amounts to 40 microns.

The profiled electrode was produced to meet these specifications from an initial blank consisting of a calibrated cylindrical copper wire which had been hard drawn to a diameter of 200 microns. A very pure electrolytic copper was employed for this purpose. The wire blank was first prerolled in a three-roller apparatus similar to that shown in FIGS. 8 and 9 but with slightly larger dimensions than that desired in the final electrode, i.e., so as to achieve an initial arm thickness of approximately 50 microns extending out to an enlarged portion located at the desired position along the length of the arm. After this preliminary cold rolling step, the partly formed electrode was annealed by heating to a temperature of about 460°C. so as to relieve the stress caused by the cold rolling. Thereafter, the electrode was rolled six times in succession through another set of three profiled rollers arranged to give the exact dimensions in cross-section of the final electrode except for the exact shape of the circular enlargements at the end of each arm which require a cutting or paring as explained above.

The crude electrode prior to the cutting step had an outer diameter of 480 microns, and this was reduced slightly by working down the end portions to an exact circular shape by means of a paring device. The finished electrode having the desired final measurements can be defined in terms of an isosceles triangle enveloping its cross-section, i.e., with the sides of the triangle tangent to the circular enlargements at the end of the radially projecting arms. This triangle has a base of approximately 200 microns, a height of approximately 280 microns and two equal sides of about 297 microns. The width or thickness between the parallel sides of the projecting arms, as viewed in a cross-section of the electrode, was 28 microns.

This finished electrode was then employed to form spinning openings in a nozzle plate by electro-erosive boring under operating conditions which resulted in a uniform gap or burn-off around the entire periphery of the electrode cross-section of 6 microns. Thus, the spinning openings had a profile corresponding exactly to that of the electrode but with an arm width of 40 microns and a corresponding enlargement of all other dimensions.

An especially uniform and smooth profiled bore can be obtained if the electrode is annealed at least once during the successive rolling steps which take place at the same final thickness dimension of the individual arms, i.e., at their smallest thickness in cross-section. Such annealing for stress relief is accomplished in a conventional manner, e.g. at an elevated temperature of about 150° C. to 650° C. and preferably about 200° C. to 550° C., between at least two of the final rolling steps, e.g. between the third and fourth steps in the preceding example. The heated electrode is of course permitted to return to about room temperature before carrying out the next cold rolling step after annealing.

The electrode should be composed of substantially pure copper, preferably an electrolytic copper which is readily available in commercial grades and which is calibrated to an exact and uniform diameter. Copper alloys previously employed in electrodes for electro-erosive machining or boring may also be employed, e.g. a copper-tungsten alloy containing at least 95 percent and preferably at least 98 percent copper. The material of the electrode should be as homogeneous as possible. The initial cylindrical copper wire is one which has been drawn to conventional hardness values in commercial practice.

The cold rolling steps of the invention are intended to cause a further structural change in the copper as it is rolled several times at the final dimensions. In particular, it has been found that relatively high values of hardness are obtained with a very homogeneous crystalline structure of the copper electrode, and even though heating for stress relief may be desired between consecutive rolling steps or stages, the primary object is to provide a very uniform and exactly dimensioned profile with uniform cross-sectional properties of the copper electrode. In other words, the hardness values of the final electrode should be about the same as the initial hard drawn copper wire or higher, for example so as to exhibit hardness values of about 75 up to about 110 kg/mm$^2$ (Vickers).

Although it is feasible to prepare electrodes having relatively large cross-sectional dimensions by milling or grinding the desired shape out of a cylindrical wire, e.g. copper or "Sparkal" wires (the latter being a sintered copper/tungsten alloy), there is a definite lower limit in terms of fine dimensions at which this type of procedure becomes useless. Thus, it was found that due to the difficulty of removing chips or grindings during the milling or grinding, one cannot produce profiles contained within a circle having a diameter below about 2 mm., and the thinnest possible arms or shanks must have a cross-sectional thickness substantially greater than 100 microns. Moreover, a milling or grinding procedure is extremely time-consuming and laborious, and it is generally impractical to provide very fine dimensions on the order of those required for the present invention except in such short lengths of the electrode that one can produce at most only about three to five bores from a single electrode. The electrode is then either completely consumed or becomes so imprecise that the resulting spinning bores or openings are not sufficiently accurate for the spinning of suitable filaments. In most cases, such electrodes as obtained by milling or grinding are so inaccurate in their dimensions that they have no practical use.

For these reasons, it is essential to produce the electrodes of the present invention by the prescribed cold rolling and cutting procedure, since no other technique will yield the required results in obtaining cross-sectional dimensions below 100 microns.

At the same time, it was quite surprising and unexpected to discover that cold rolling could be carried out successfully down to the desired arm or shank thicknesses as low as approximately 15–20 microns. Although cold rolling of metals is generally a well known procedure, no evidence could be found that cold rolling was ever attempted in forming a multi-lobal profiled cross-section wherein it is essential to achieve very thin radially projecting arms, especially on the order of 15 – 80 microns or preferably about 20 to 60 microns. When working down to these dimensions, one would normally expect that any metal, including copper, would be strongly subjected to stress cracking or similar imperfections which would destroy the electrode for its intended use. However, these expected disadvantages can be avoided and the desired results ensured provided that the electrode, as it is formed, is passed a number of times through the assembly of profiled rollers set and maintained at the prescribed final cross-sectional dimensions of the radially projecting arms. When the cross-sectional shape is asymmetrical, the position of the electrode during the sequential cold rolling steps is also maintained throughout this operation. As pointed out above, it is especially desirable in achieving very small cross-sectional dimensions below about 40 microns and even at about 50 to 60 microns to subject the electrode being formed to a brief heat treatment between consecutive rolling steps at least once or several times. Above these cross-sectional dimensions, this heat treatment may be omitted and should not be used at all when working outside of the scope of the invention, e.g. at cross-sectional dimensions above 100 microns.

The present invention is essentially directed to solving the very urgent problem of providing extremely small electrodes capable of being used in a practical manner for the electro-erosive boring of spinning openings required for spinning profiled fiber-forming polymer filaments. The particular combination of cold rolling steps as prescribed herein together with a relatively simple final cutting, paring or trimming step is functional and leads to the desired electrode only when forming a hard drawn cylindrical copper wire to the prescribed fine cross-sectional dimensions. Within this restricted scope of the invention, one can vary the procedural steps and the required apparatus to provide many different multi-lobal cross-sectional configurations wherein the radial projection or length of the lobes, arms, shanks or the like substantially exceeds their width. Also, it will be appreciated that the resulting electrodes may be used in applications other than the spinning of filaments.

The invention is hereby claimed as follows:

1. A profiled electrode for electro-erosive boring which comprises an elongated copper element having a multi-lobal cross-section defined by a plurality of radially projecting arms shaped by cold rolling a hard drawn cylindrical copper wire, said arms being confined within an outermost circumference of less than about 600 microns diameter and said arms having a thickness of between about 15 and 80 microns, said cold rolling being carried out by conducting the wire a number of times through an assembly of profiling rollers which impart the shape of said arms to said copper wire and by subjecting the shaped copper wire for stress relief to an annealing heat treatment at least once between consecutive rolling steps.

2. A profiled electrode as claimed in claim 1 wherein said arms have a thickness of between about 20 and 60 microns.

3. A profiled electrode as claimed in claim 1 wherein said elongated element is composed of a substantially pure electrolytic copper.

4. A profiled electrode as claimed in claim 1 wherein said elongated element has a tri-lobal cross-section defined by three radially projecting arms.

5. A profiled electrode as claimed in claim 4 wherein said arms have thickness of between about 15 and 40 microns.

6. A profiled electrode as claimed in claim 1 wherein said elongated element is composed of a copper-tungsten alloy containing at least about 95 percent copper.

7. A profiled electrode as claimed in claim 1 with a Vickers hardness value of about 75 up to 110 kg/mm$^2$.

8. A profiled electrode as claimed in claim 7 wherein said elongated element is composed of a substantially pure electrolytic copper.

9. A profiled electrode as claimed in claim 7 wherein said elongated element is composed of a copper-tungsten alloy containing at least 95 percent copper.

* * * * *

PO-1050
(5/69)

UNITED STATES PATENT OFFICE
CERTIFICATE OF CORRECTION

Patent No. 3,746,827                    Dated July 17, 1973

Inventor(s) Wilhelm Martin and Werner Rieger

It is certified that error appears in the above-identified patent and that said Letters Patent are hereby corrected as shown below:

Column 4, line 26, "14" should read -- 15 --.

Column 5, line 18, "diameter Of the" should read -- diameter of the --; line 40, "inventiOn" should read -- invention --.

Column 6, line 17, "slits" should read -- slots --.

Signed and sealed this 27th day of November 1973.

(SEAL)
Attest:

EDWARD M. FLETCHER, JR.            RENE D. TEGTMEYER
Attesting Officer                  Acting Commissioner of Patents